US012686491B2

(12) United States Patent
Brody et al.

(10) Patent No.: US 12,686,491 B2
(45) Date of Patent: Jul. 21, 2026

(54) V/STOL AIRCRAFT

(71) Applicant: XTI Aircraft Company, Greenwood Village, CO (US)

(72) Inventors: David Brody, Greenwood Village, CO (US); David Ambrose, Palmdale, CA (US); Kevin Watters, Auburn, KY (US)

(73) Assignee: XTI Aircraft Company, Greenwood Village, CO (US)

( * ) Notice: Subject to any disclaimer, the term of this patent is extended or adjusted under 35 U.S.C. 154(b) by 73 days.

(21) Appl. No.: 18/644,579

(22) Filed: Apr. 24, 2024

(65) Prior Publication Data

US 2025/0346349 A1 Nov. 13, 2025

Related U.S. Application Data

(60) Provisional application No. 63/461,449, filed on Apr. 24, 2023.

(51) Int. Cl.
B64C 29/00 (2006.01)
B64C 27/54 (2006.01)

(52) U.S. Cl.
CPC .......... B64C 29/0033 (2013.01); B64C 27/54 (2013.01)

(58) Field of Classification Search
CPC ............................ B64C 29/0033; B64C 27/54
See application file for complete search history.

(56) References Cited

U.S. PATENT DOCUMENTS

| | | | |
|---|---|---|---|
| 204,108 | A | 5/1878 | Steinway et al. |
| 1,783,458 | A * | 12/1930 | Windsor ............. B64C 29/0033 244/92 |
| 1,987,788 | A * | 1/1935 | Morton .................. B64C 39/08 244/56 |
| 2,700,425 | A | 1/1955 | Ruble |

(Continued)

FOREIGN PATENT DOCUMENTS

| | | |
|---|---|---|
| EP | 3290336 B1 | 1/2019 |
| KR | 102317660 B1 | 10/2021 |

(Continued)

OTHER PUBLICATIONS

International Search Report and Written Opinion of International Application No. PCT/US2015/029751 mailed Feb. 16, 2016, 14 pp.

(Continued)

*Primary Examiner* — Tye William Abell
(74) *Attorney, Agent, or Firm* — Davis Graham & Stubbs LLP

(57) ABSTRACT

A vertical/short takeoff and landing aircraft includes a pair of ducted lift/thrust fans that are rotatably movable between a first vertical lift position and a second horizontal thrust position. The lift/thrust fans cantilever from a fuselage of the aircraft, forward of the aircraft's wings. A downwardly exhausting, ducted lift fan is disposed within the aircraft's fuselage, aft of the aircraft's pitch axis. A power plant, disposed within the fuselage, is coupled with the lift/thrust fans and the lift fan by a transmission system. The lift/thrust fans and lift fan are positioned with respect to one another to be triangulated about the aircraft's center of gravity and the aircraft's center of lift.

19 Claims, 10 Drawing Sheets

(56)                    References Cited

U.S. PATENT DOCUMENTS

| | | | |
|---|---|---|---|
| 3,335,977 A | * | 8/1967 | Meditz ..................... B64C 3/42 |
| | | | D12/330 |
| 3,499,620 A | | 3/1970 | Haberkorn et al. |
| 3,638,884 A | | 2/1972 | Timperman |
| 3,652,037 A | | 3/1972 | Dolby |
| 4,022,405 A | | 5/1977 | Peterson |
| D274,511 S | | 7/1984 | Clifton |
| D274,512 S | | 7/1984 | Clifton |
| D302,676 S | | 8/1989 | Clifton |
| D311,719 S | | 10/1990 | Haga |
| 5,419,514 A | | 5/1995 | Ducan |
| 5,597,137 A | | 1/1997 | Skoglun et al. |
| 6,708,920 B2 | | 3/2004 | Fukuyama |
| D493,411 S | | 7/2004 | Fong |
| D500,008 S | | 12/2004 | Bulaga |
| 6,843,447 B2 | | 1/2005 | Morgan |
| 6,886,776 B2 | | 5/2005 | Wagner et al. |
| 6,892,980 B2 | | 5/2005 | Kawai et al. |
| 7,267,300 B2 | | 9/2007 | Heath |
| 7,410,122 B2 | | 8/2008 | Robbins et al. |
| 7,472,863 B2 | | 1/2009 | Pak |
| 7,735,774 B2 | | 6/2010 | Lugg |
| 7,857,254 B2 | | 12/2010 | Parks |
| 7,874,513 B1 | | 1/2011 | Smith |
| 8,152,096 B2 | | 4/2012 | Smith |
| 8,181,903 B2 | | 5/2012 | Posva |
| D665,333 S | | 8/2012 | Oliver |
| 8,777,150 B2 | | 7/2014 | Wang et al. |
| 9,022,312 B2 | | 5/2015 | Kosheleff et al. |
| 9,731,818 B2 | | 8/2017 | Dekel |
| 10,287,011 B2 | | 5/2019 | Wolff |
| 12,391,377 B2 | | 8/2025 | Mengotii |
| 2007/0018035 A1 | * | 1/2007 | Saiz ........................ B64C 39/10 |
| | | | 244/12.3 |
| 2007/0246601 A1 | | 10/2007 | Layton |
| 2012/0043413 A1 | * | 2/2012 | Smith ................. B64C 29/0033 |
| | | | 244/12.4 |
| 2012/0091257 A1 | * | 4/2012 | Wolff .................... B64U 30/26 |
| | | | 244/12.4 |
| 2014/0339372 A1 | * | 11/2014 | Dekel ................. G05D 1/0676 |
| | | | 244/7 R |
| 2015/0314865 A1 | * | 11/2015 | Bermond ................ B64C 27/52 |
| | | | 244/17.27 |
| 2016/0214710 A1 | * | 7/2016 | Brody ..................... B64C 27/26 |
| 2018/0057157 A1 | * | 3/2018 | Groninga .............. B64C 39/008 |

FOREIGN PATENT DOCUMENTS

| | | |
|---|---|---|
| WO | WO2012102698 | 8/2012 |
| WO | WO2024226576 A2 | 10/2024 |

OTHER PUBLICATIONS

International Search Report and Written Opinion of International Application No. PCT/US2024/025956 mailed Aug. 23, 2024, 13 pp.

* cited by examiner

V/STOL AIRCRAFT

CROSS-REFERENCE TO RELATED APPLICATIONS

The present application is a non-provisional of U.S. Provisional Patent Application Ser. No. 63/461,449, titled "VTOL AIRCRAFT", filed Apr. 24, 2023, which is incorporated herein as if set out in full.

BACKGROUND

Because traffic congestion has increased significantly in and near urban areas over recent decades, and airports of all sizes have become more crowded during the same period, long distance travel as well as commuting between cities takes more and more time. Also, there has been a significant increase in the demand for private more efficient point-to-point air travel services in recent years. At the same time, opportunities to secure sites and regulatory approval for new airports are extremely rare. Airports occupy a large footprint due to long runways and expansive air space needed for fixed wing aircraft to safely takeoff and land. Constructing such airports is cost prohibitive for most municipalities, and if cost is not a barrier, noise, pollution and safety issues presented by urban airports is problematic. Accordingly, there is an increasing need in the aviation industry for vertical takeoff and landing (VTOL) and short takeoff and landing (STOL) aircraft that may take off, land, and be stored, on relatively small parcels of commercial and residential real estate, and which meet customers' need for privacy and point-to-point air transport services. Such aircraft will be able to use the existing helicopter network of over 5,000 helipads in the U.S. alone as well as job sites, parks, and other grassy or paved spots, golf courses, and other landing areas that are safe and legal.

From the time the helicopter was invented in 1939, helicopters have remained a special-purpose aircraft due to their control systems, their large-diameter rotors, and their slow speed and limited range. Helicopter control systems include complex mechanisms for continuously adjusting the rotor pitch. Such control systems are expensive to construct and to maintain. Further, the large-diameter exposed rotors and the tail rotor present serious safety and operational challenges. Most importantly, helicopters are not able to fly anywhere near the speed, range, and comfort of fixed-wing aircraft. The helicopter is a slow and noisy machine, with an average cruise speed of 120 miles an hour, which any fast car could equal or exceed on a racetrack. The average helicopter has a shorter range than any car, usually about 200 miles before it must land and refuel. Private jets and other business airplanes, on the other hand, are much quieter, smoother, and more comfortable than a helicopter. But of course, fixed-wing aircraft need an airport or at least a runway.

Over the decades, there have been numerous attempts to combine the speed, range and comfort of a fixed-wing airplane with the VTOL and hover capability of a helicopter. The tiltrotor category of aircraft is one such VTOL/fixed-wing ("Powered Lift") aircraft. However, tiltrotors can only lift off and land vertically because the rotor blades would strike the ground in the forward flight configuration. The large engine/rotor assemblies also diminish the aerodynamics of the wings to which they are secured. This reduces performance and further decreases safety where an emergency gliding landing is necessary. This is particularly problematic in tiltrotor aircraft where a gliding landing becomes necessary shortly after takeoff when the rotors are positioned vertically, and a "tilt-wing" aircraft when the rotors and wings are positioned vertically. Further, because of its size and complexity, the tiltrotor could not be the basis (from a physical or engineering standpoint) for a light, fast, compact, and affordable aircraft in the commercial market.

There is another category of VTOL aircraft designed to reach high speeds—that is, helicopters with additional components to increase speed, such as propellers, known as "compound helicopters." Sikorsky's X2 technology aircraft and AVX Aircraft Company's coaxial rotor/dual ducted fan technology are included in this category. The Sikorsky and AVX aircraft are not in commercial production but are designed to be capable of achieving high speed with VTOL and hovering capability superior to any fixed-wing aircraft except the tiltrotor. However, like the tiltrotor, these compound helicopters have standard large helicopter blades for lift during take-off and landing, rather than smaller, safer, quieter, and more efficient ducted fans for lift during take-off and landing, and they all lack the speed and range of fixed-wing aircraft. Various prototype or experimental fixed-wing aircraft with rotating ducted fans were flown in the mid-20th century. However, the engines and fans didn't provide sufficient lift for cargo or passengers, and those aircraft experienced significant controllability problems.

Over the past 80 years many innovators and aerospace engineers have tried to develop variations of the helicopter and variations of fixed-wing airplanes that combine VTOL capability with speed and range. Many of these prior art VTOL aircraft designs suffer a wide array of similar disadvantages that have prevented their widespread acceptance for the many possible uses and applications of a VTOL aircraft with the speed and range of a business aircraft. Another disadvantage is that many such designs require several times the horsepower to maintain the aircraft aloft, in takeoff and hover modes. Accordingly, such aircraft suffer from relatively high rates of fuel consumption, both while hovering and in forward, horizontal flight.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

According to the present technology, the present V/STOL aircraft embodiments are fundamentally different from prior aircraft designs. In particular, embodiments of the present aircraft present fixed-wing, ducted fan, V/STOL aircraft that use a uniquely configured set of triangulated, ducted fans. This provides aircraft that are practical, with competitive speed, range, and comfort for passengers, and a substantial payload capability.

In various embodiments, the aircraft includes a fuselage having a forward end portion, a rearward end portion, and a central portion that extends between the forward end portion and rearward end portion. The fuselage defines a central longitudinal axis of the aircraft. A pair of wings extend laterally outward from the fuselage. A downwardly exhausting, ducted lift fan is disposed within the fuselage, between a pitch axis of the aircraft and the rearward end portion of the fuselage. At least one retractable or at least one re-closeable cover that is selectively movable between open and closed positions with respect to the ducted lift fan. A pair of ducted lift/thrust fans are cantilevered outwardly from side portions of the fuselage, forward of the pair of wings, such that the fans are positioned symmetrically with one another on opposite sides of a roll axis of the aircraft, forward of the pitch axis. The pair of ducted lift/thrust fans are selectively, rotatably movable between a first position in which they provide vertical lift and a second position in which they provide horizontal thrust.

Embodiments of the aircraft position the ducted lift fan and the pair of ducted lift/thrust fans with respect to one another to be triangulated about a center of gravity for the aircraft. Thrust from each of the pair of ducted lift/thrust fans is independently controllable to provide roll control of the aircraft. The pair of ducted lift/thrust fans rotate about their pivot shaft axis to provide yaw control. Thrust from the lift fan in the rearward portion of the fuselage is controllable to provide pitch and yaw control of the aircraft.

Embodiments of the aircraft include a power plant that is disposed within the fuselage and operatively coupled with the pair of ducted lift/thrust fans and the lift fan. In some such embodiments, the power plant includes a plurality of engines that are operatively coupled with a single power transmission system, which is coupled with the pair of ducted lift/thrust fans and the lift fan. A first output shaft and second output shaft extend transversely, in opposite directions from a gear box, which is operatively coupled with the plurality of engines, and are coupled with reduction gear boxes associated with the pair of ducted lift/thrust fans. A third output shaft extends rearwardly from the gearbox and is coupled with a reduction gear box associated with the rear lift fan contained in the fuselage.

These and other aspects of the present system and method will be apparent after consideration of the Detailed Description and Figures herein. It is to be understood, however, that the scope of the invention shall be determined by the claims as issued and not by whether given subject matter addresses any or all issues noted in the Background or includes any features or aspects recited in this Summary.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Figure 1:
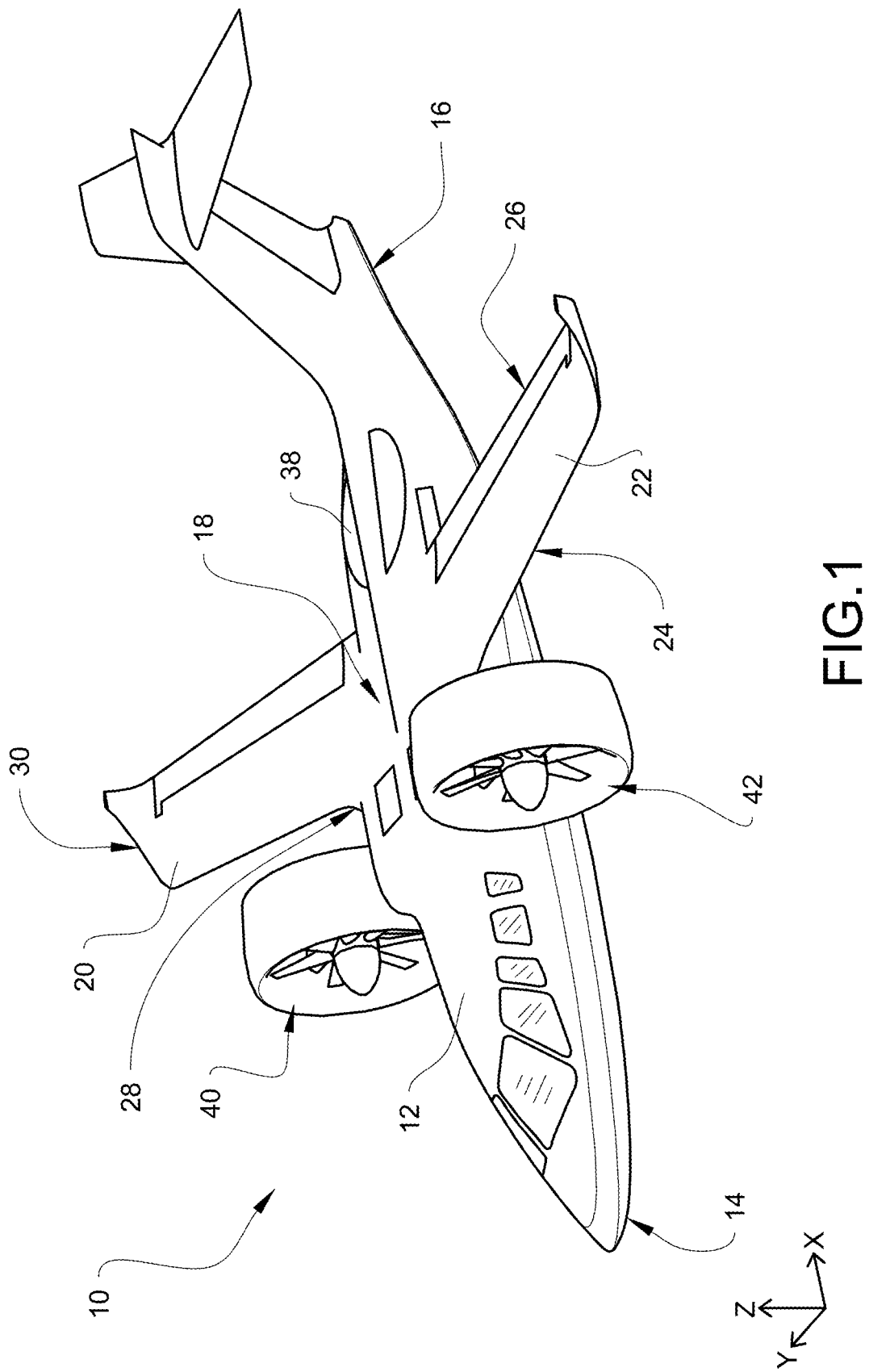
FIG. 1 depicts a perspective view of one embodiment of the V/STOL aircraft of the present technology and one manner in which the V/STOL aircraft may be configured for forward flight.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Embodiments of the present technology, as they relate to a V/STOL aircraft 10, are generally depicted in FIGS. 1-12. With particular reference to FIGS. 1-9, embodiments of the V/STOL aircraft 10 include a fuselage 12 having a forward end portion 14, a rearward end portion 16, and a central portion 18 that extends between the forward end portion 14 and rearward end portion 16. Various embodiments of the fuselage 12 are elongated, defining a central longitudinal roll axis X of the V/STOL aircraft 10. In at least some embodiments, the fuselage 12 may be configured with a passenger and flight control compartment. Aft of the passenger and flight control compartment, the V/STOL aircraft 10 may include a storage or payload compartment. In other embodiments, the V/STOL aircraft 10 may be increased in size to accommodate a greater number of individuals and/or payload.

A pair of wings and, in particular a first wing 20 and second wing 22, are secured in a fixed position with respect to the fuselage 12. The first wing 20 and second wing 22 are each defined by a leading edge portion 24, a trailing edge portion 26 portion, a root end portion 28, and an opposite tip end portion 30. The root end portions 28 of the first wing 20 and second wing 22 are respectively coupled with the central portion 18 of the fuselage 12, such that the first wing 20 and second wing 22 extend laterally outward from the fuselage 12. In at least some embodiments, the first wing 20 and second wing 22 are of a swept wing design.

Figure 2:
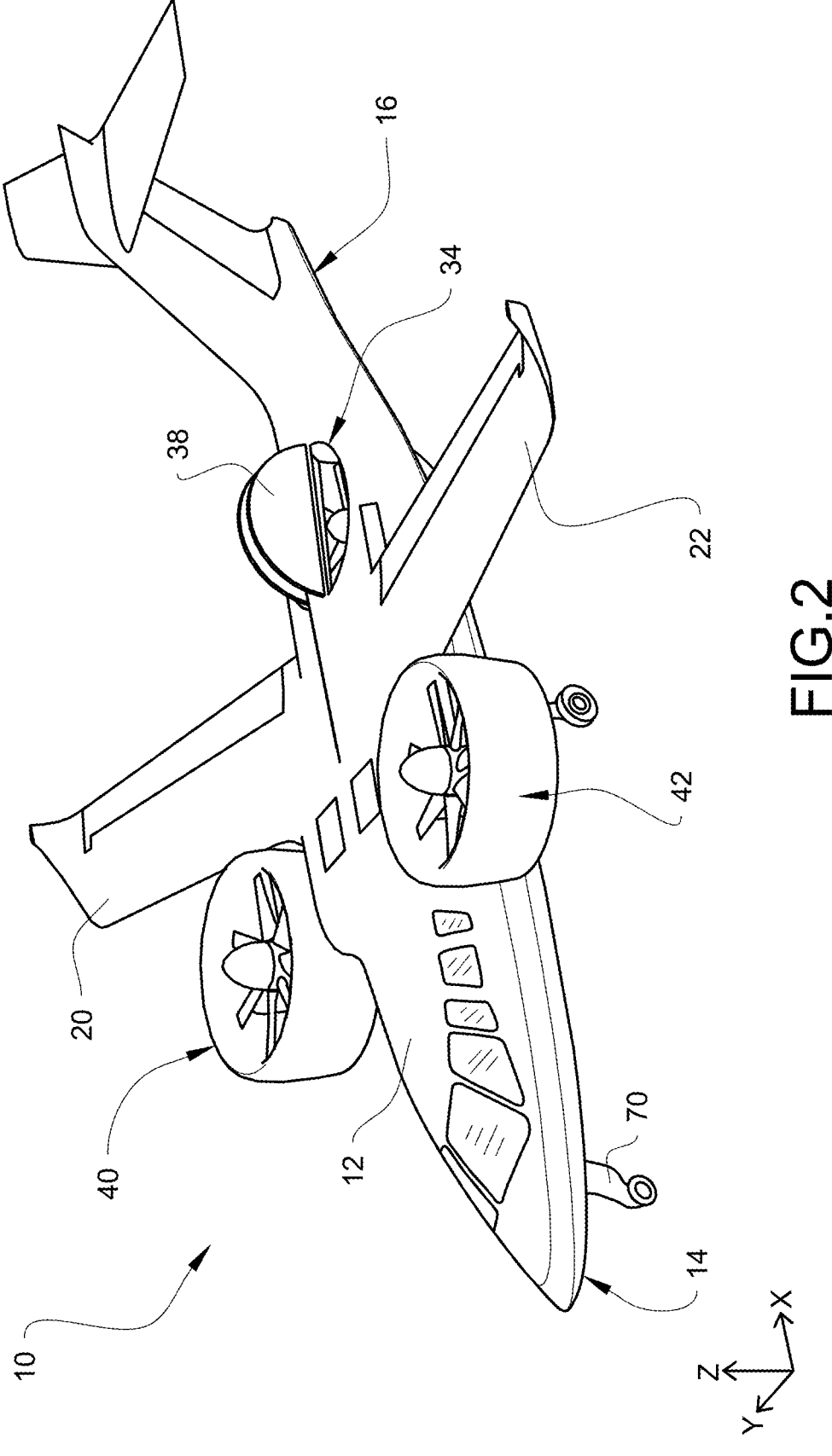
FIG. 2 depicts a bottom, perspective view of the V/STOL aircraft depicted in FIG. 1 and depicts one manner in which the V/STOL aircraft may be configured for landing or takeoff.
Figures 3, 4:
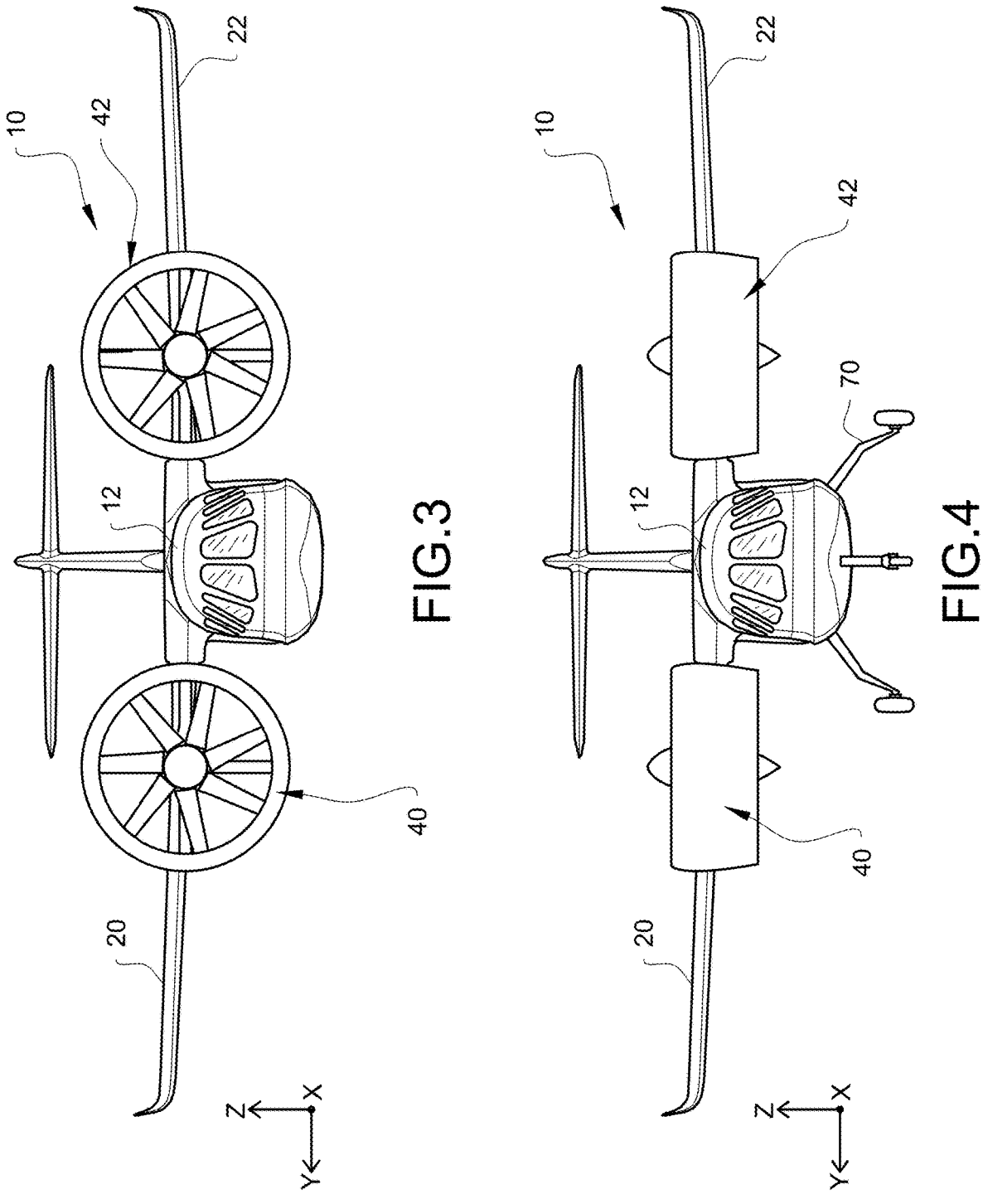
FIG. 3 depicts a front elevation view of the V/STOL aircraft depicted in FIG. 1.
FIG. 4 depicts a front elevation view of the V/STOL aircraft depicted in FIG. 2.
Figure 5:
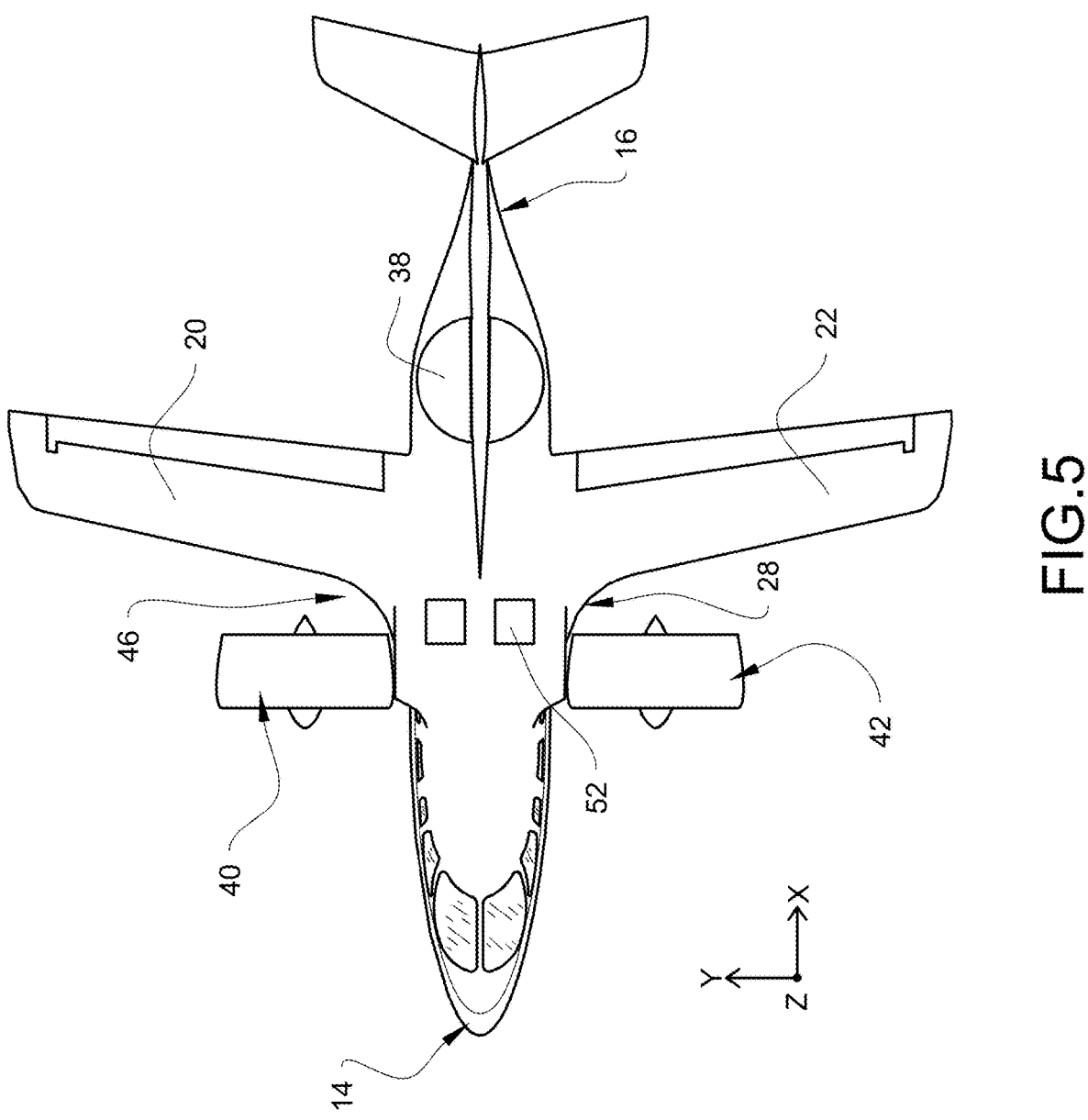
FIG. 5 depicts a top plan view of the V/STOL aircraft depicted in FIG. 1.
Figure 6:
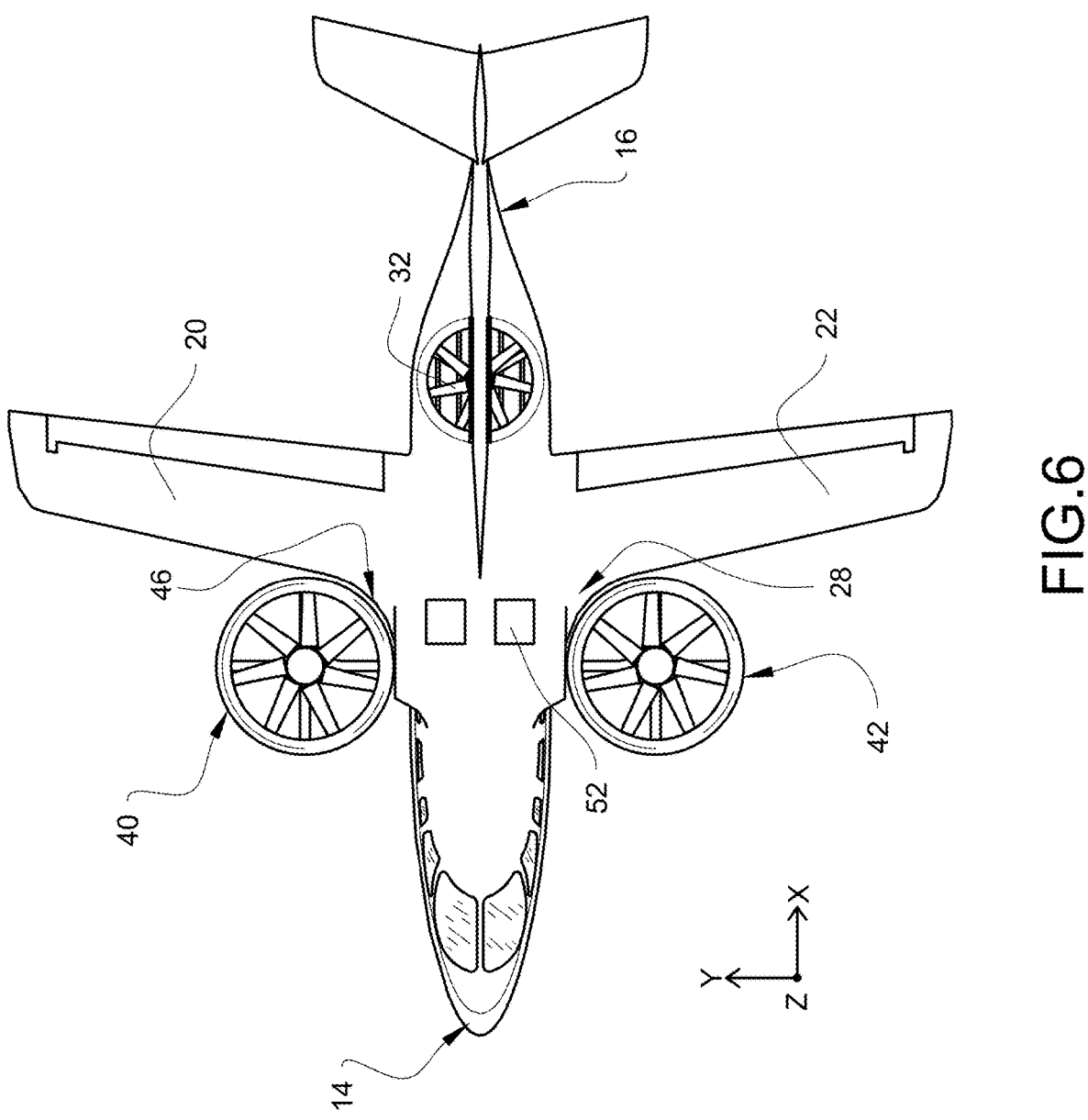
FIG. 6 depicts a top plan view of the V/STOL aircraft depicted in FIG. 2.
Figures 7, 8:
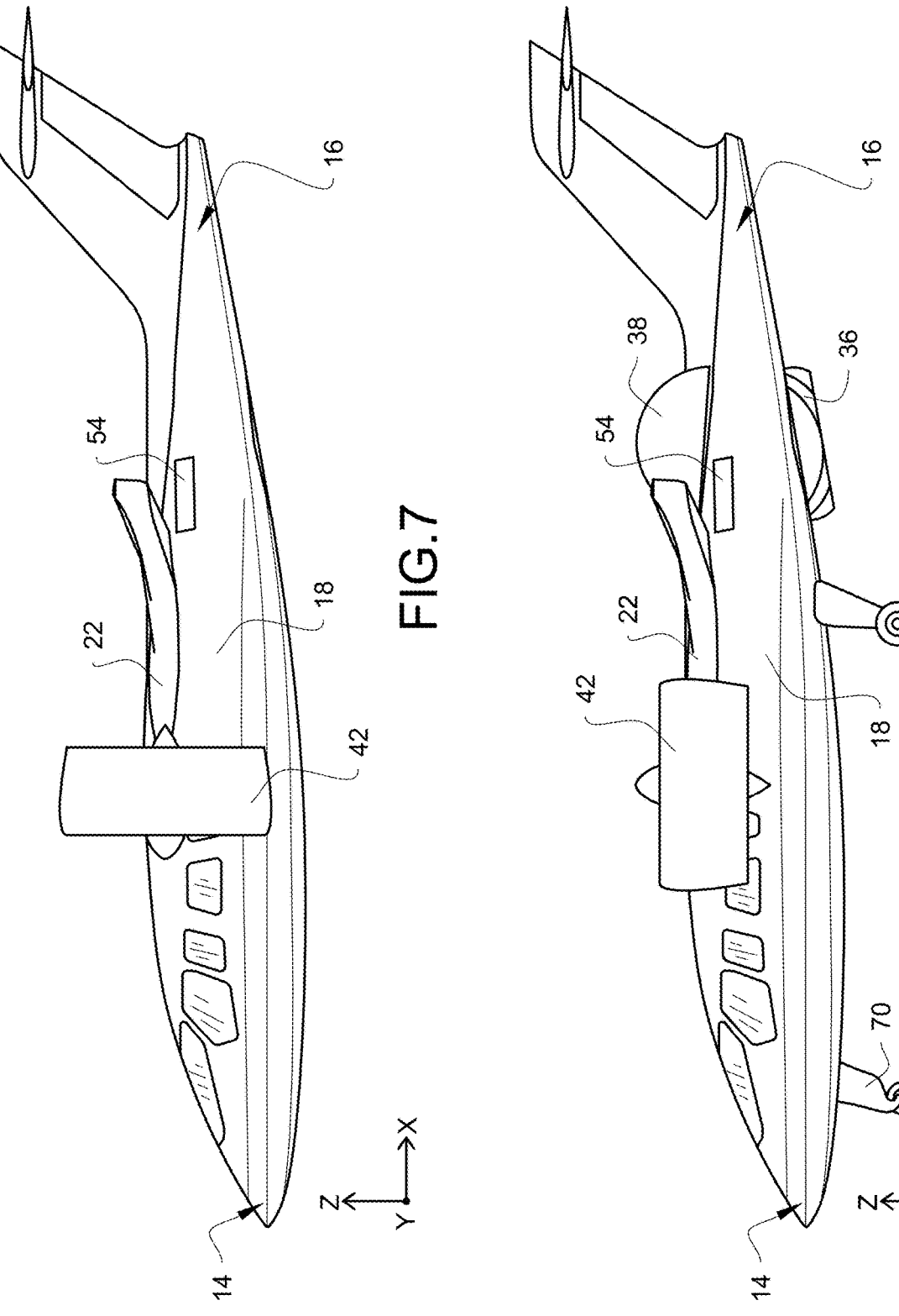
FIG. 7 depicts a side elevation view of the V/STOL aircraft depicted in FIG. 1.
FIG. 8 depicts a side elevation view of the V/STOL aircraft depicted in FIG. 2.
Figure 9:
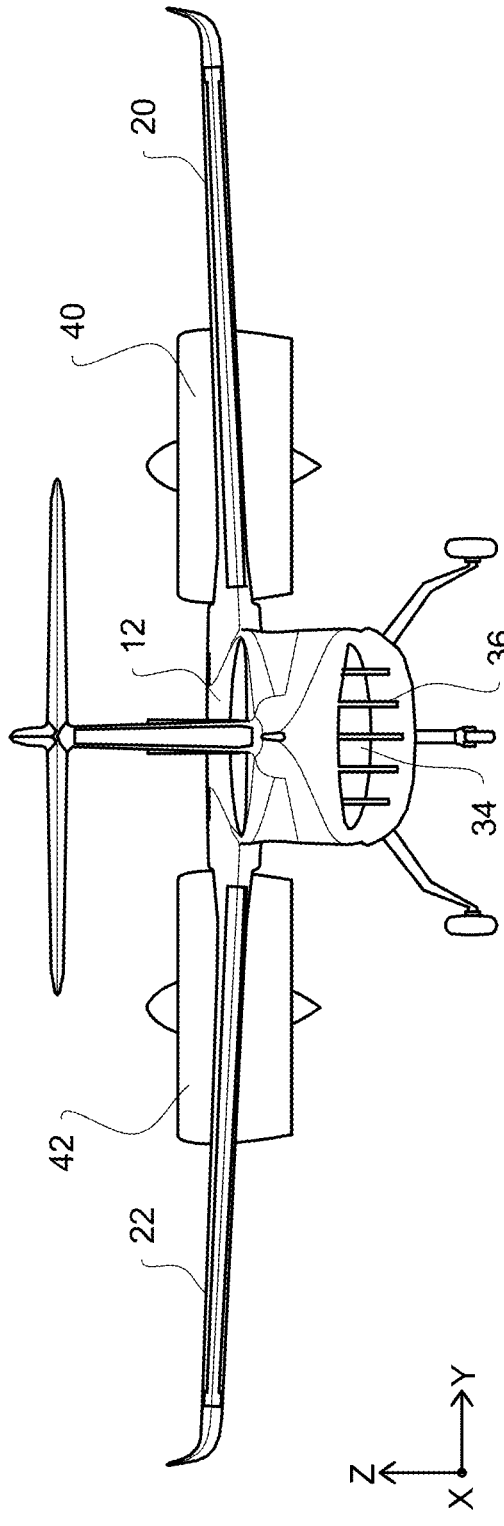
FIG. 9 depicts a rear elevation view of the V/STOL aircraft depicted in FIG. 2.

With reference to FIGS. 2 and 6, various embodiments of the V/STOL aircraft 10 include a downwardly exhausting, ducted lift fan 32 that is disposed within the fuselage 12, between a pitch axis Z of the V/STOL aircraft 10 and the rearward end portion 16 of the fuselage 12. As this term is used herein, a "ducted fan" is simply a system that accelerates air as it passes through a duct or shroud. The duct serves primarily to induce additional air mass flow through the fan blades than would occur without the duct. This increases the "thrust", which is the force of reaction to the acceleration of air, as compared to a non-ducted fan or propeller. With specific reference to FIGS. 2 and 6, air is accelerated through the horizontal duct 34 by a multi-bladed fan. In the depicted embodiment, the horizontal duct 34 is defined as an opening that penetrates the fuselage 12, behind the pitch axis Z of the V/STOL aircraft 10 and forward from the rearward end portion 16 of the fuselage 12. It is contemplated that the horizontal duct 34 and the fuselage 12 could be formed of unitary construction or as separate structures that are secured in a fixed position with respect to one another. It is contemplated that the size of the rotor may increase or decrease according to the dimensions and desired performance characteristics for the V/STOL aircraft 10.

With reference to FIGS. 1, 2, 5, 6, 8, and 9, a set of hinged "clam shell" or louvered bottom door covers 36 may be associated with the bottom outlet opening of the horizontal duct 34 and a similar set of top door covers 38 may be associated with the top inlet opening. The bottom door covers 36 and top door covers 38 will be provided, in various embodiments, to selectively move between open positions (depicted in FIGS. 1 and 5) and closed positions (depicted in FIGS. 2, 6, 8, and 9). In particular, the bottom door covers 36 and top door covers 38 will be disposed in the open position where the lift fan 32 is operated to produce lifting thrust through the horizontal duct 34. In some embodiments, the bottom door covers 36 and top door covers 38 will be placed in the closed position when the V/STOL aircraft 10 is operated in forward flight, where lifting thrust from the lift fan 32 is not desired or needed. It is contemplated that the bottom door covers 36 and top door covers 38 may be provided in a plurality of components that retract fore and aft or in opposite, lateral directions. In still another embodiment, it is contemplated that the bottom door covers 36 and top door covers 38 may be provided as a plurality of louvers that rotate between closed and substantially open positions. In one such embodiment, one or more louvers are pivotally coupled directly beneath the lift fan 32 and movable between open and closed positions and discreet points therebetween. In the closed position, the louvers form a part of the bottom door covers 36 to close the bottom outlet opening of the horizontal duct 34. This reduces the size of the outboard panels of the bottom door covers 36. The louvers are disposed in an open position during hovering flight of the V/STOL aircraft 10. Operative mechanical or electronic coupling of the louvers and flight controls, such as rudder pedals or the like, enable selective angular disposition of the louvers when in the open position. Selective angular position beneath the bottom outlet opening of the horizontal duct 34 may be used to deflect the thrust output of the horizontal duct 34 and provide the V/STOL aircraft 10 with an aspect of yaw control.

With reference to FIGS. 1-9, embodiments of the V/STOL aircraft 10 include a pair of ducted lift/thrust fans. In particular, the depicted embodiments include a first lift/thrust fan 40 and second lift/thrust fan 42 that respectively cantilever from opposite side portions of the fuselage 12, forward from the first wing 20 and second wing 22. In various embodiments, the first lift/thrust fan 40 and second lift/thrust fan 42 are positioned closely adjacent the fuselage 12 and the root end portions 28 of the first wing 20 and second wing 22. It is contemplated that the size of the rotor may increase or decrease according to the dimensions and desired performance characteristics for the V/STOL aircraft 10. In some embodiments, the pitch of the blades within the rotors may be varied on demand according to the desired output performance. Thrust from each of the lift/thrust fans and is independently controllable in various embodiments.

The first lift/thrust fan 40 and second lift/thrust fan 42 are positioned symmetrically with one another on opposite sides of a roll axis X of the V/STOL aircraft 10 and forward of the pitch axis Z. In this manner, the lift fan 32 and the pair of ducted lift/thrust fans are positioned with respect to one another to be triangulated about at least one, and in some embodiments all, of: a center of lift for the first wing 20 and second wing 22; a center of lift for the lift fan 32 and the ducted lift/thrust fans; and a center of gravity for the V/STOL aircraft 10. The first lift/thrust fan 40 and second lift/thrust fan 42 are coupled with the fuselage 12 such that they are selectively, rotatably movable between a first position in which they provide vertical lift (FIG. 2) and a second position in which they provide horizontal thrust (FIG. 1). In some embodiments, the first lift/thrust fan 40 and second lift/thrust fan 42 are rotated between the first and second positions using mechanical, hydraulic, or electromechanical actuators capable of inducing movement, while being subjected to significant forces external, as well as locking the assembly in a single position when desired.

With reference to FIGS. 2 and 6, various embodiments of the V/STOL aircraft 10 position the first lift/thrust fan 40 and second lift/thrust fan 42 closely adjacent the fuselage 12 and the root end portions 28 of the first wing 20 and second wing 22. In particular embodiments, the root end portions 28 of the first wing 20 and second wing 22 are shaped to define partial, curvilinear fan recesses 46 that approximate a shape of a circumferential edge portion of the first lift/thrust fan 40 and second lift/thrust fan 42. In this manner, the first lift/thrust fan 40 and second lift/thrust fan 42 nest within the curvilinear fan recesses 46 when the first lift/thrust fan 40 and second lift/thrust fan 42 are horizontally disposed in the first position. This configuration provides several benefits over previous VTOL aircraft configurations. For example, positioning the pair of ducted lift/thrust fans in front of the wings creates additional lift due to the higher velocity propeller flow over the wings. This additional lift is maximized by having the propellers as close to the wing as possible while still permitting the ducts to rotate. Another benefit of this particular configuration is that it provides "positive ground effect." This effect is created when the air hits the ground and then turns up to help "push" the aircraft up. On some VTOL aircraft the air sucks the aircraft down, due to the relative position of the propellers and the wings. The position of the pair of ducted lift/thrust fans relative to the wing and the fuselage, in the present technology, helps "capture the fountain" of air impinging on the ground, turning up and directly impacting the lower wing surface and the lower surface of the fuselage 12. In particular embodiments, this effect will be more effective the closer the pair of ducted lift/thrust fans are to the wings.

Figure 10:
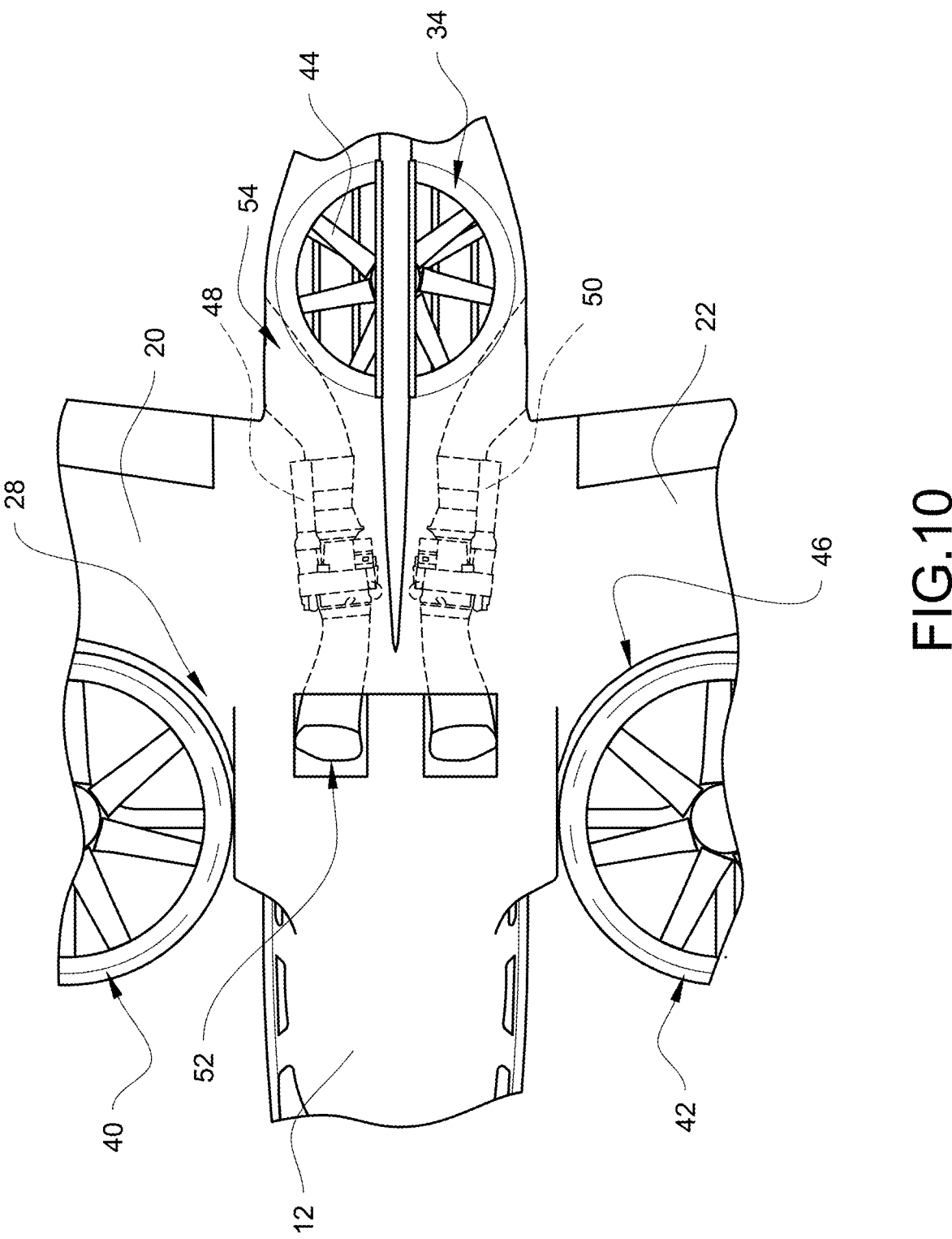
FIG. 10 depicts a partial, top plan view of an embodiment of the V/STOL aircraft of the present technology and demonstrates one manner in which engines, air inlet ducts, and exhaust ports may be arranged in the fuselage.
Figure 11:
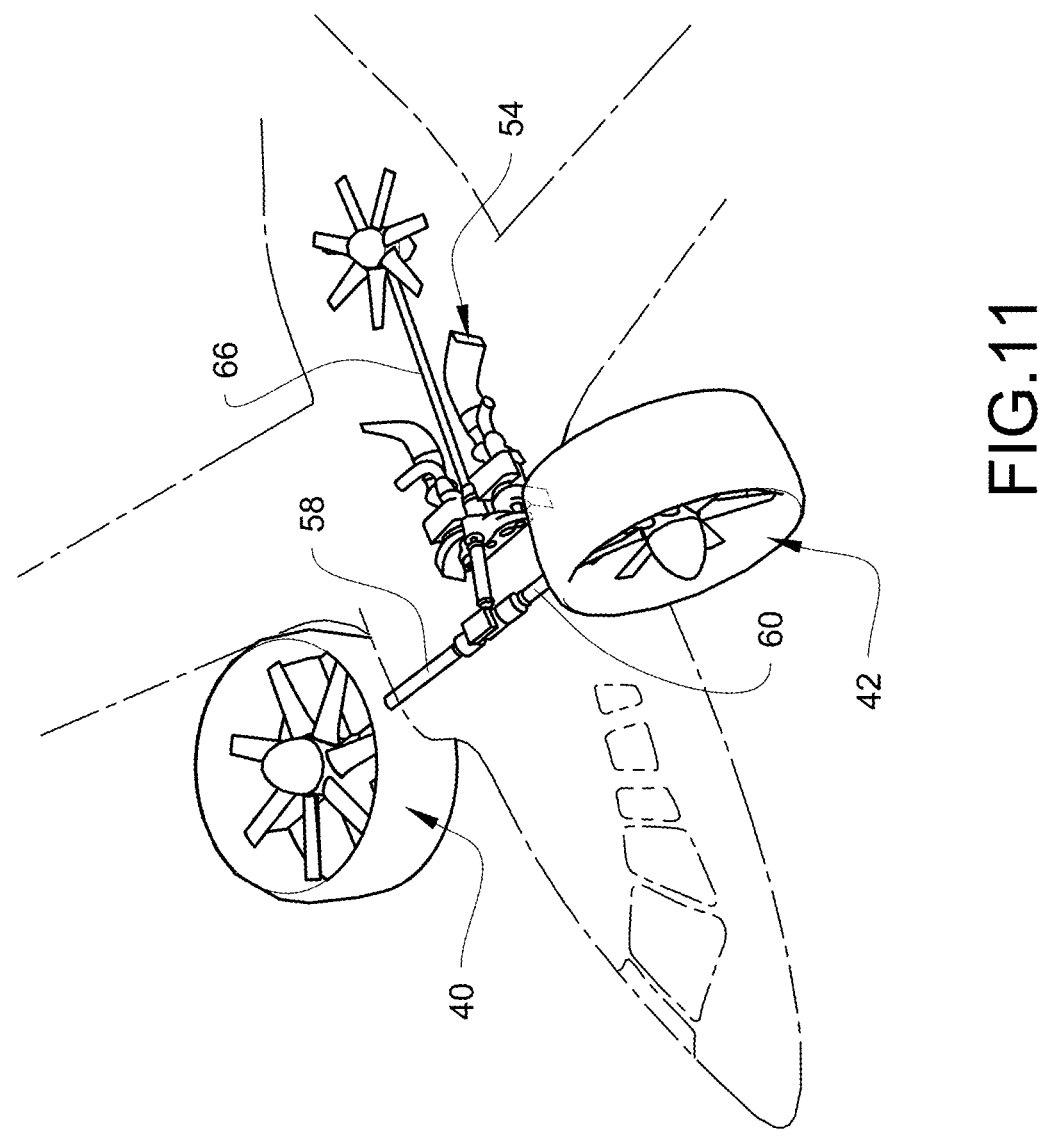
FIG. 11 depicts a perspective schematic view of an embodiment of the V/STOL aircraft of the present technology and demonstrates one manner in which engines and transmission systems may be coupled with the ducted fans.
Figure 12:
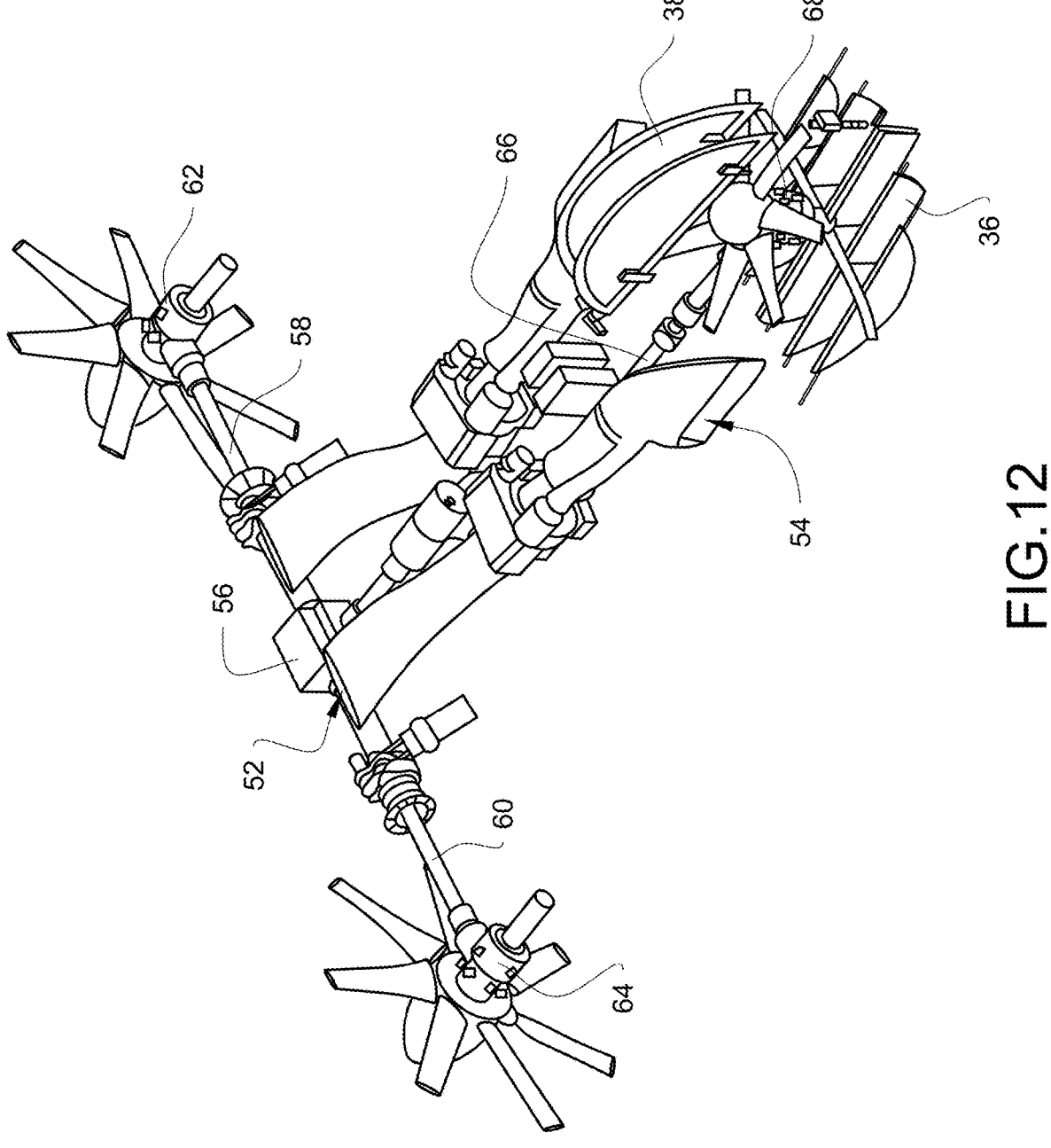
FIG. 12 depicts an isometric view of engines and a power transmission system configured for use with embodiments of the V/STOL aircraft of the present technology.

With reference to FIGS. 10-12, the V/STOL aircraft 10 includes a power plant and power transmission system that supplies power to the lift fan 32, the first lift/thrust fan 40, and second lift/thrust fan 42. It is contemplated that a single engine could be used to supply power to the V/STOL aircraft 10. However, the depicted embodiments include a first engine 48 and second engine 50 that are positioned astride one another within the fuselage 12 between the first wing 20 and second wing 22. A pair of opposing air inlet ducts 52 penetrate the fuselage 12, forward from the first engine 48 and second engine 50. A pair of exhaust ports 54 pass from the first engine 48 and second engine 50 and penetrate the opposite sides of the central portion 18 of the fuselage 12.

With further reference to FIG. 12, an exemplary power transmission system for use with the V/STOL aircraft 10 includes a main combiner gearbox 56 that receives the power output from the first engine 48 and second engine 50. In the depicted embodiment, a first output shaft 58 and second output shaft 60 extend transversely from the main combiner gear box 56 and engage a first reduction gear 62 and second reduction gear 64 associated with the first lift/thrust fan 40 and second lift/thrust fan 42, respectively. A third output shaft 66 extends rearwardly from the main combiner gear box 56 and engages a third reduction gear 68 associated with the lift fan 32. In various embodiments, it is contemplated that the output shafts described herein may be provided as dual, coaxial shafts, which provide redundancy to the power transmission system. In some embodiments, the main combiner gearbox 56 will contain Sprag Clutches, also known as overrunning clutches. In such embodiments, if one engine fails, the Sprag clutch permits the operating engine to drive all three fans in VTOL mode and both wing fans in CTOL mode. A typical twin engine propeller plane can't do this. Rather, when such aircraft lose an engine they lose thrust on one side. The first engine 48 and second engine 50 (CT7 engines in particular embodiments) have power boost modes when one engine is inoperative. For example, a CT7-8A6 can boost up to 2,850 hp for 30 seconds at the expense of engine life.

The V/STOL aircraft 10 includes flight control systems for operating the V/STOL aircraft 10 through various flight operations. Aspects of the flight operations will be monitored, and in certain instances, directly controlled by a flight control computer. A processor associated with the flight control computer will receive data input from one or more associated systems. For example, embodiments of the flight control systems include a plurality of pilot inputs, which transmit data to the flight control computer. These pilot inputs include, but are not limited to, pitch and roll commands from a flight control stick, yaw from rudder pedals, trim commands, and power commands from engine throttle controls. In various embodiments, the flight control systems are operatively coupled with aircraft control surfaces that include elevators, ailerons, and a rudder. In some embodiments, the flight control systems are operatively coupled with the ducted lift/thrust fans, and the lift fan 32 in a manner that permits selective control over functions of the aircraft control surfaces, the ducted lift/thrust fans, and the lift fan 32. In some such embodiments, the flight control systems permit selective control of fan blade pitch, power, or rotational speeds of the ducted lift/thrust fans, and the lift fan 32. Embodiments of the V/STOL aircraft 10 further include a motion sensor/accelerometer for measuring aircraft acceleration in the X, Y, and Z axis. A rate gyroscope may be provided to receive and relay data related to rotation angles of pitch, yaw, and roll. One or more sensors detect the retracted and deployed states of landing gear 70. Various peripheral systems provide environmental data to the flight control computer including an altimeter, an air data sensor system, a pitot-static probe, and a total temperature probe. The data from such peripheral systems is processed within the flight control computer, which may store such data within one or more associated memory storage systems. One or more displays or multi-functional displays relay the state of flight control to the flight crew.

The flight control systems of the V/STOL aircraft 10, as described above, simplify vertical takeoff and landing operations as well as the transitions between hovering modes and forward flight. For example, an operator initiates a vertical takeoff by positioning the lift/thrust fans in the first, takeoff position so that the thrust thereof directs toward the ground as shown in FIG. 2. The operator engages a pilot input to initiate a start mode. Data received within the flight control computer actuates the bottom door covers 36 and top door covers 38 to move into open positions. Start sequences are then initiated for the lift fan 32, first lift/thrust fan 40, and second lift thrust/fan. The flight control system allows the fans to reach an idling state. When the thrust of the lift fan 32, first lift/thrust fan 40, and second lift/thrust fan 42 reach determined values or greater, the operator engages a hovering mode from a pilot input associated with the flight control system. The thrust of the lift fan 32, first lift/thrust fan 40, and second lift/thrust fan 42 are increased until the V/STOL aircraft 10 lifts off.

With the V/STOL aircraft 10 hovering in a stable manner, the operator selects a cruise mode from a pilot input associated with the flight control computer. A signal is sent from the flight control computer to gradually tilt the first lift/thrust fan 40 and second lift/thrust fan 42 from the first position to the second position in order to produce a forward moving force. As the V/STOL aircraft 10 accelerates into forward flight, lift force is generated on the wings and the V/STOL aircraft 10 cruises with the thrust of the first lift/thrust fan 40 and second lift/thrust fan 42 directed backward. The operator may then execute manual operation by means of the control stick and steering pedals. Concurrently, or in the alternative, flight operations can be left to automatic operation performed based on data received from the peripheral sensors and systems associated with the flight control computer.

The V/STOL aircraft 10, of the present technology, provides a vertical takeoff and landing aircraft that can cruise with high speed and does not need a runway for taking off or landing because it may take off from, or land on, the ground vertically. When desired, the V/STOL aircraft 10 may also perform short (STOL) or conventional takeoffs and landings.

Although the technology been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An aircraft capable of vertical takeoff and landing, the aircraft comprising:

a fuselage having a forward end portion, a rearward end portion, and a central portion that extends between the forward end portion and rearward end portion; the fuselage defining a central longitudinal axis of the aircraft;

a pair of wings, each having: a leading edge portion; a trailing edge portion; a root end portion respectively coupled with the central portion of the fuselage; and an opposite tip end portion extending laterally outward from the fuselage; the root end portions of each of the wings and the fuselage defining a curvilinear fan recess;

a pair of ducted lift/thrust fans respectively cantilevered from mounting points on opposite side portions of the fuselage that are spaced forwardly from the leading edge portions of the wings, such that the fans are positioned symmetrically with one another on opposite sides of a roll axis of the aircraft and forward of a pitch axis of the aircraft; the pair of ducted lift/thrust fans being selectively, rotatably movable between a first position in which they provide vertical lift and a second position in which they provide horizontal thrust; each of the pair of ducted lift/thrust fans respectively, rotatably disposed within one of the curvilinear fan recess, wherein the curvilinear fan recesses are shaped to approximate a shape of a circumferential edge portion of the ducted lift/thrust fans and leave the pair of ducted lift/thrust fans uncovered when the pair of ducted lift/thrust fans are in the first position; and a downwardly exhausting, ducted lift fan disposed within the fuselage, between the pitch axis and the rearward end portion of the fuselage.

2. The aircraft of claim 1 wherein the ducted lift fan and the pair of ducted lift/thrust fans are positioned with respect to one another to be triangulated about a center of gravity for the aircraft.

3. The aircraft of claim 1 wherein the ducted lift fan and the pair of ducted lift/thrust fans are positioned with respect to one another to be triangulated about a center of lift for the ducted lift fan and the pair of ducted lift/thrust fans.

4. The aircraft of claim 1 wherein the ducted lift fan and the pair of ducted lift/thrust fans are positioned with respect to one another to be triangulated about: a center of gravity for the aircraft; a center of lift for the aircraft; and a center of lift for the ducted lift fan and the pair of ducted lift/thrust fans.

5. The aircraft of claim 1 wherein thrust from each of the pair of ducted lift/thrust fans is independently controllable.

6. The aircraft of claim 1 wherein pitch and yaw control of the aircraft is effected by varying power distributed to the ducted lift/thrust fans and ducted lift fan by at least one of: increasing fan blade pitch; increasing fan rotational velocity; or varying the angle of vanes at the top and/or the bottom of a duct of the ducted lift fan.

7. The aircraft of claim 1 wherein roll control of the aircraft is effected by varying the power distributed to the ducted lift/thrust fans by increased fan blade pitch or increased fan rotational velocity.

8. The aircraft of claim 1 wherein yaw control of the aircraft is effected by rotating the lift/thrust fans in opposite directions.

9. The aircraft of claim 1 further comprising at least one cover that is selectively movable between open and closed positions with respect to the ducted lift fan.

10. The aircraft of claim 9 wherein the at least one cover includes at least one louver that is positioned beneath the ducted lift fan and in line with a thrust output of the ducted lift fan; the at least one louver being selectively, pivotably movable along various degrees between the open and closed positions with respect to the ducted lift fan, such that the thrust output is selectively, angularly directed, to provide yaw control for the aircraft.

11. The aircraft of claim 1 further comprising:

flight control systems operatively coupled with aircraft control surfaces, the ducted lift/thrust fans, and the lift fan in a manner that permits selective control over functions of the aircraft control surfaces, the ducted lift/thrust fans, and the lift fan.

12. The aircraft of claim 11 wherein the aircraft control surfaces include elevators, ailerons, and a rudder.

13. The aircraft of claim 11 wherein the flight control systems permit selective control of fan blade pitch, power, or rotational speeds of the ducted lift/thrust fans and the lift fan.

14. The aircraft of claim 1 further comprising a power plant disposed within the fuselage, the power plant being operatively coupled with the pair of ducted lift/thrust fans and the lift fan.

15. The aircraft of claim 14 wherein the power plant is comprised of a plurality of engines that are operatively coupled with a single power transmission system that is coupled with the pair of ducted lift/thrust fans and the lift fan.

16. The aircraft of claim 15 wherein a first output shaft and second output shaft extend transversely, in opposite directions from a gear box, which is operatively coupled with the plurality of engines, and are coupled with reduction gear boxes associated with the pair of ducted lift/thrust fans; a third output shaft extends rearwardly from the gearbox and is coupled with a reduction gear box associated with the rear lift fan contained in the fuselage.

17. An aircraft capable of vertical takeoff and landing, the aircraft comprising:

a pair of ducted lift/thrust fans respectively cantilevered from mounting points on opposite side portions of a fuselage that are spaced forwardly from leading edge portions of a pair of wings, such that the ducted lift/thrust fans are positioned symmetrically with one another on opposite sides of a roll axis of the aircraft and forward of a pitch axis of the aircraft; the pair of ducted lift/thrust fans being selectively, rotatably movable between a first position in which they provide vertical lift and a second position in which they provide horizontal thrust; root end portions of each of the wings and the fuselage defining curvilinear fan recesses that are shaped to approximate a shape of a circumferential edge portion of the ducted lift/thrust fans; each of the pair of ducted lift/thrust fans respectively, rotatably disposed within one of the curvilinear fan recesses so that the pair of lift/thrust fans nest within the curvilinear fan recesses, and leave the pair of ducted lift/thrust fans uncovered, when the pair of ducted lift/thrust fans are disposed in the first position; and a downwardly exhausting, ducted lift fan disposed within the fuselage, between the pitch axis and a rearward end portion of the fuselage.

18. The aircraft of claim 17 wherein the ducted lift fan and the pair of ducted lift/thrust fans are positioned with respect to one another to be triangulated about at least one of: a center of gravity for the aircraft; a center of lift for the aircraft; and a center of lift for the ducted lift fan and the pair of ducted lift/thrust fans.

19. The aircraft of claim 17 wherein the position of the pair of ducted lift/thrust fans relative to the pair of wings and the fuselage, when the ducted lift/thrust fans are positioned in the first position, captures air impinging on the ground, turning up and directly impacting a lower surface of the wings and a lower surface of the fuselage.

\* \* \* \* \*